United States Patent [19]
Kung

[11] Patent Number: 5,969,852
[45] Date of Patent: Oct. 19, 1999

[54] PORTABLE PROJECTION MICROSCOPE

[76] Inventor: Su-Min Kung, 8F, No. 276-2, Sec. 1, Tai-tung Road, Hsichih, Taipei, Taiwan

[21] Appl. No.: 08/994,499

[22] Filed: Dec. 19, 1997

[51] Int. Cl.$^6$ ................................................. G02B 21/36
[52] U.S. Cl. ............................................ 359/369; 353/39
[58] Field of Search .................................. 359/368, 369, 359/381; 353/39, 74, 77

[56] References Cited

U.S. PATENT DOCUMENTS

| | | | |
|---|---|---|---|
| 2,170,967 | 8/1939 | Eppenstein et al. | 353/39 |
| 2,401,224 | 5/1946 | Burton | 359/505 |
| 3,572,884 | 3/1971 | Chirayath | 359/369 |
| 3,900,252 | 8/1975 | DiSalvo et al. | 353/39 |
| 4,444,475 | 4/1984 | Yamada | 359/369 |
| 5,307,098 | 4/1994 | Okita | 353/63 |
| 5,694,242 | 12/1997 | Omi | 359/369 |

*Primary Examiner*—Cassandra Spyrou
*Assistant Examiner*—Mark A. Robinson

[57] ABSTRACT

A portable projection microscope includes a body, a microscopic device, a screen, optical elements, and two angle regulating components. The portable projection microscope is used as a microscope for observing the sample or as a projector for displaying the enlarged image of the sample from the objectives of the microscopic device simply by replacing the eyepiece with a mirror seat. The portable projection microscope is cheap and convenient to carry.

16 Claims, 9 Drawing Sheets

PORTABLE PROJECTION MICROSCOPE

FIELD OF THE INVENTION

This invention relates to a portable projection microscope, particularly to a portable projection microscope which is used as a microscope for observing a sample or as a projector for displaying an enlarged image of the sample from the objectives of the microscopic means simply by replacing the eyepiece with a mirror seat. The portable projection microscope is cheap and convenient to carry.

BACKGROUND OF THE INVENTION

Because outdoor activities for students are becoming more and more popular, the nature curriculum is often held in outdoor natural environment so that the students can observe and study the natural objects, such as animals, plants, microorganisms. During the outdoor nature curriculum, the students always need to observe, record and discuss the natural objects. If the students want to observe the natural objects, a microscope is helpful for observing. If several students want to observe the same object simultaneously, a projector is needed. The conventional microscope and projector are precious high precision optical instruments and they are very heavy and not easy to carry. As the optical technology improves, the microscope and projector can be made from plastic materials to make them easily portable. The teenagers can use them to observe the natural objects. However, the conventional microscope and projector are separately made. The microscope cannot be used as a projector. If the students want to observe the enlarged image of the cell, tissue or microorganism sample, they should carry both microscope and projector. Thus, it is inconvenient for the students to use these instruments because the microscope and projector are put into two packages and difficult to carry. In addition, it is expensive to buy both the microscope and projector. The structures of an easily portable microscope is not disclosed before.

SUMMARY OF THE INVENTION

It is an object of the present invention to provide a portable projection microscope which can be used as a microscope for observing the sample or as a projector for displaying the enlarged image of the sample from the objectives of the microscopic means simply by replacing the eyepiece with a mirror seat.

It is another object of the present invention to provide an easily portable projection microscope whose configuration can be changed between using state and portable state for reducing the volume of the projection microscope. A handle is pivotably disposed on the body for easily carrying.

According to the present invention, the portable projection microscope comprises a body with a housing and a base mounted on the housing, a microscopic means secured to the base, a screen of which one side is pivotably mounted on the housing, an optical means mounted on the microscopic means, and a plurality of angle regulating components which are mounted on the body for regulating an angle between the screen and the body.

The microscopic means has one or more objectives. The optical means is used for directing an enlarged image to be viewed by a user from the objective. When an eyepiece is used as the optical means, the portable projection microscope is a microscope. When a mirror seat is used as the optical means, the portable projection microscope becomes a projector for displaying the enlarged image of the sample from the objective.

BRIEF DESCRIPTIONS OF THE DRAWINGS

DETAILED DESCRIPTIONS OF THE INVENTION

Figure 1:
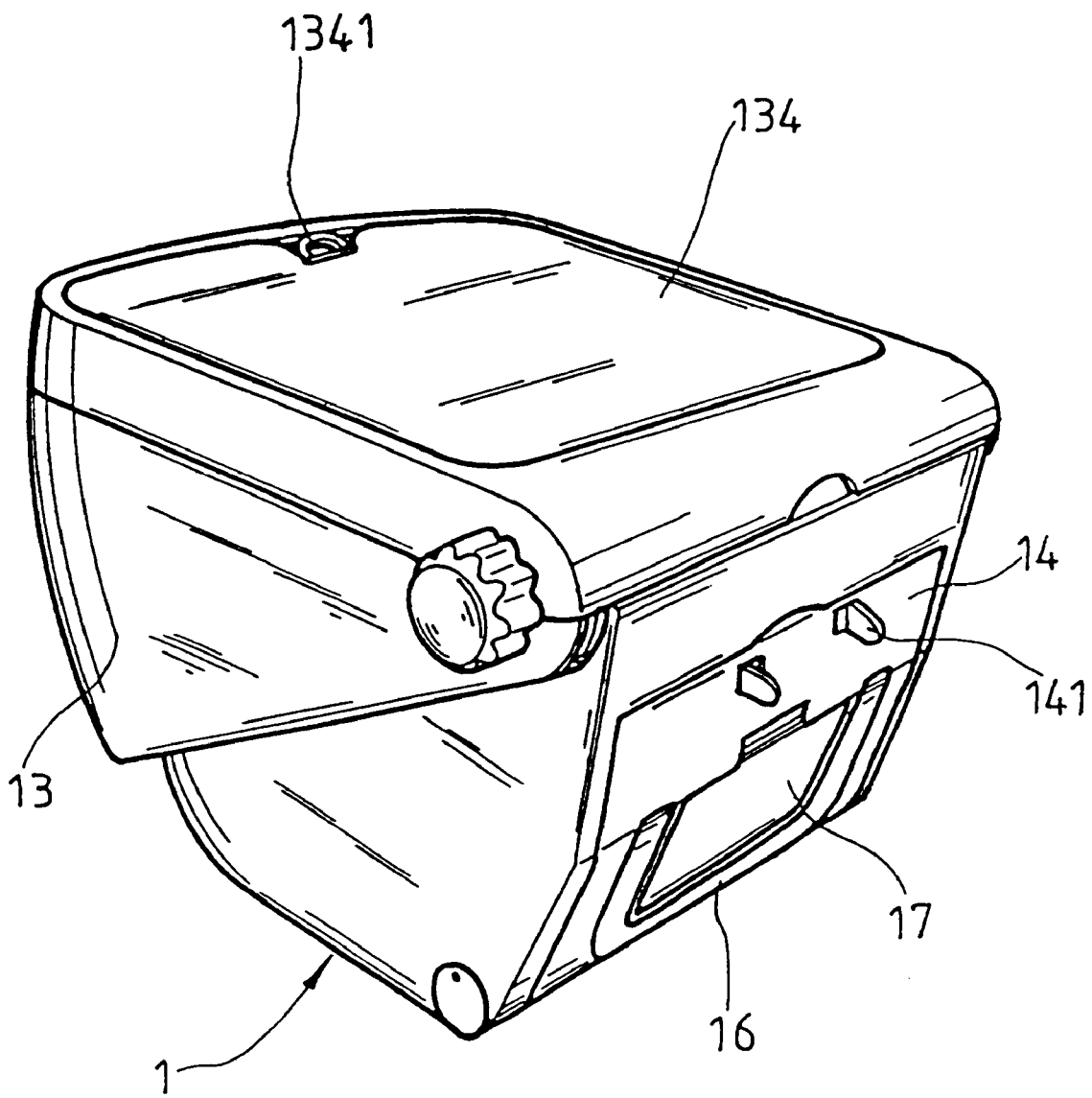
FIG. 1 is a perspective view of the portable projection microscope in the portable state of the present invention.

With reference to FIGS. 1 to 8, in one embodiment of the present invention, the projection microscope comprises a body 1 having a hollow cavity space 145. At the front of the body 1 is an opening 146. At the opening 146, a base 14 is pivotably mounted. The base 14 covers the opening 146 or is opened to an approximately same level of the bottom surface of the base 14. A light source 27 is disposed in the base 14. A power switch 144 for controlling the lighting of the light source 27 is disposed onto the base 14. The emitted light from the light source 27 is upwardly directed from the bottom surface of the microscopic means 2 to the revolving nosepiece 26. On the front side of the base 14 is a handle 16 for being held by the hand of a user to carry the projection microscope when the base 14 is covered and fixed to the body 1.

Figure 4:
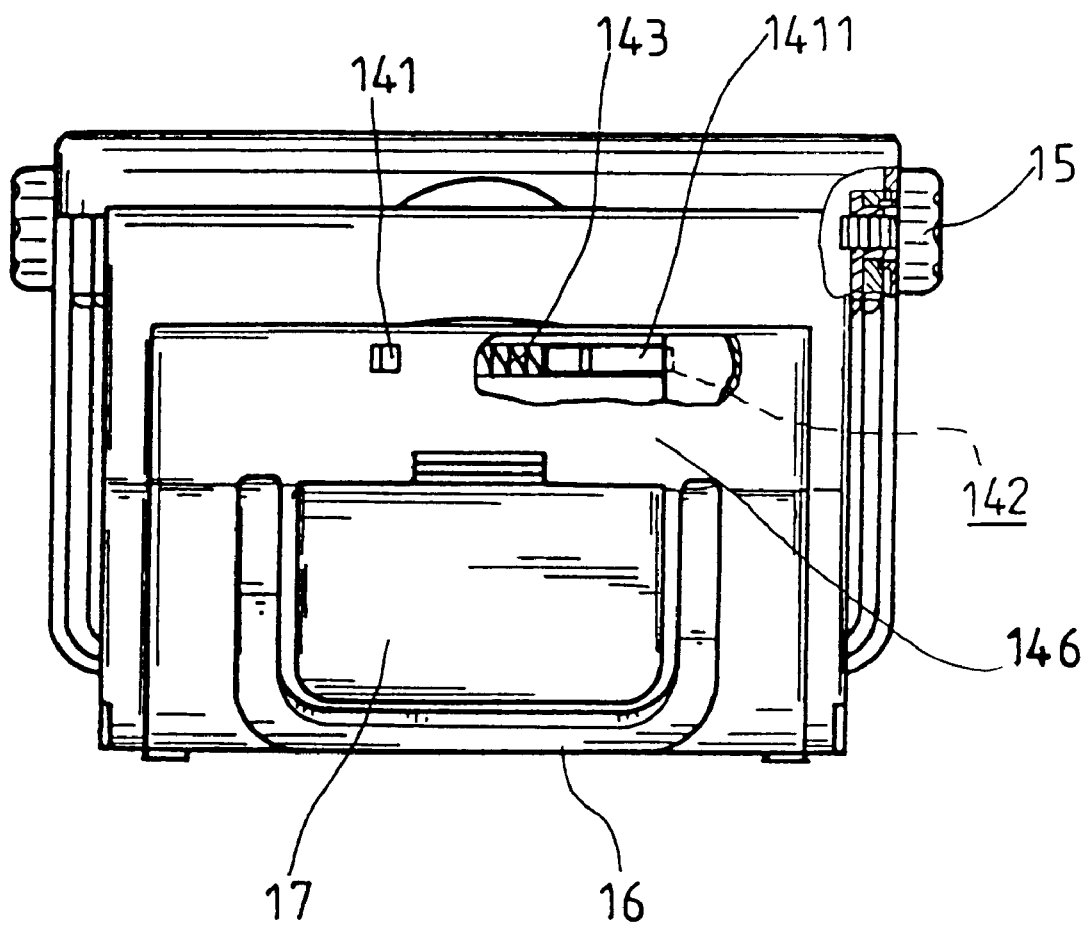
FIG. 4 is a front view of the portable projection microscope of the present invention showing the structure of engaging pins and the engaging holes.
Figure 5:
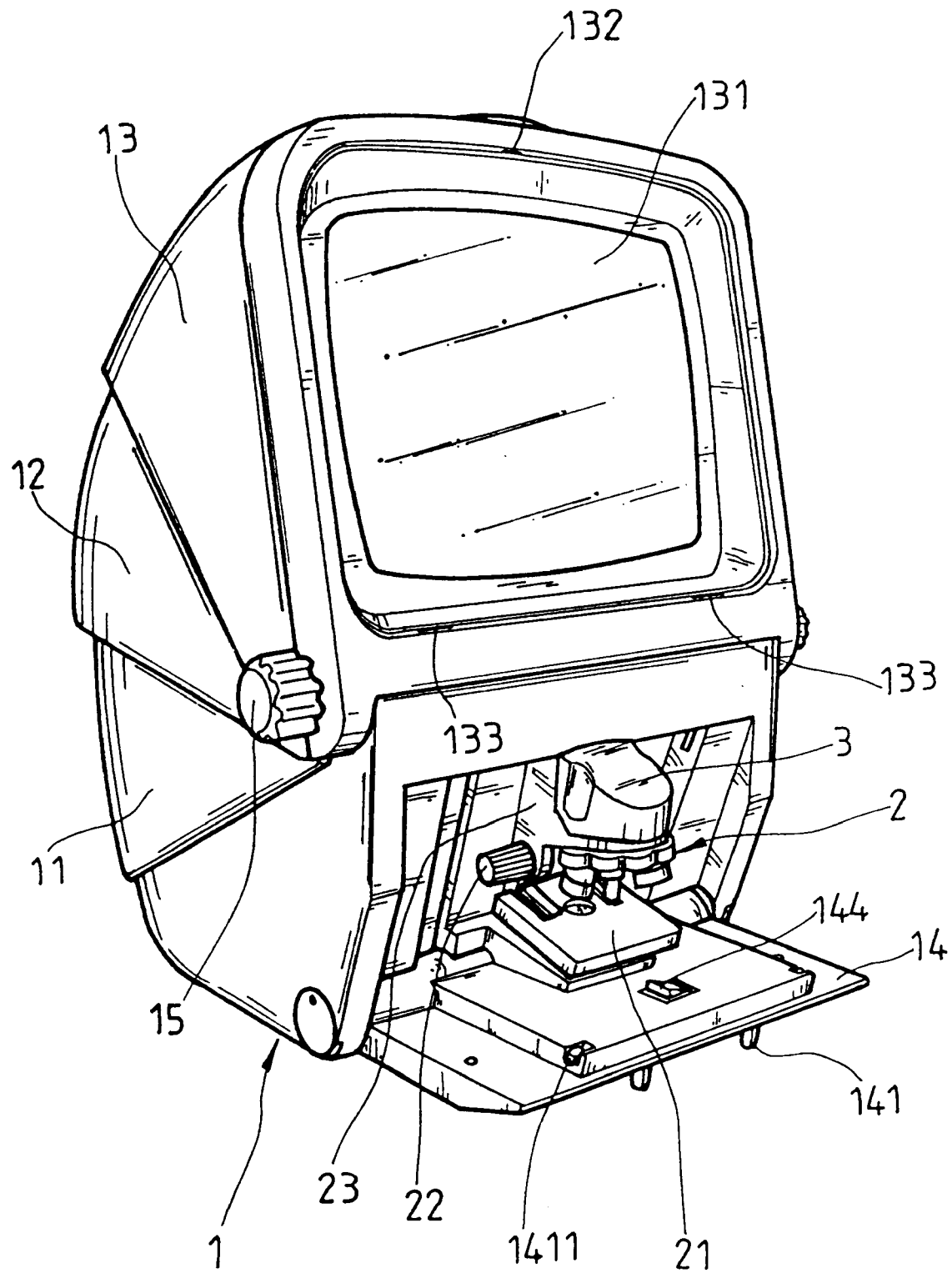
FIG. 5 is a perspective view of the portable projection microscope of the present invention showing that the mirror seat is mounted on the microscopic means and that the portable projection microscope is used as a projector.
Figure 8:
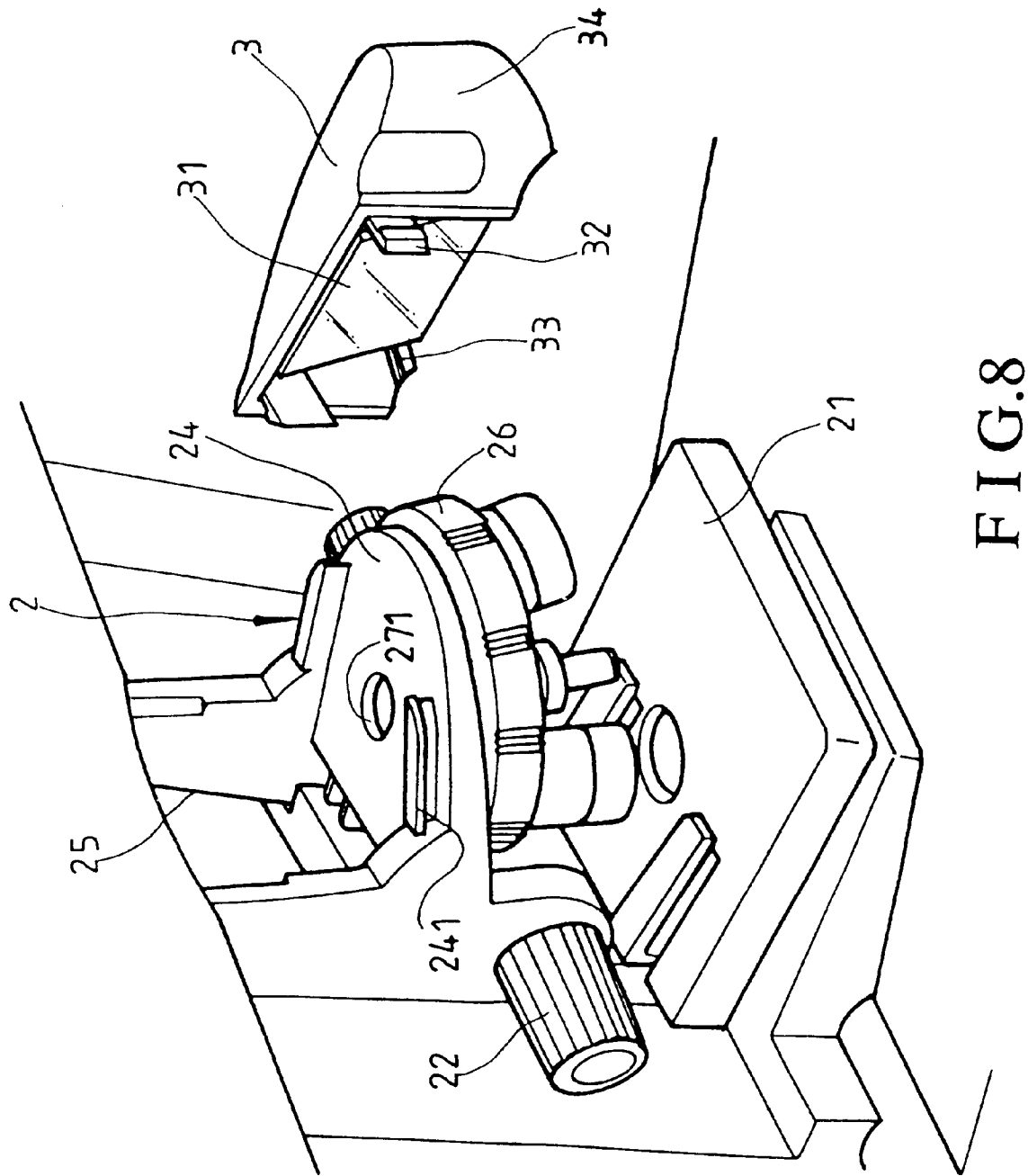
FIG. 8 is a partial perspective view of the microscopic means of the present invention in association with the mirror seat to be used as a projector.
Figure 9:
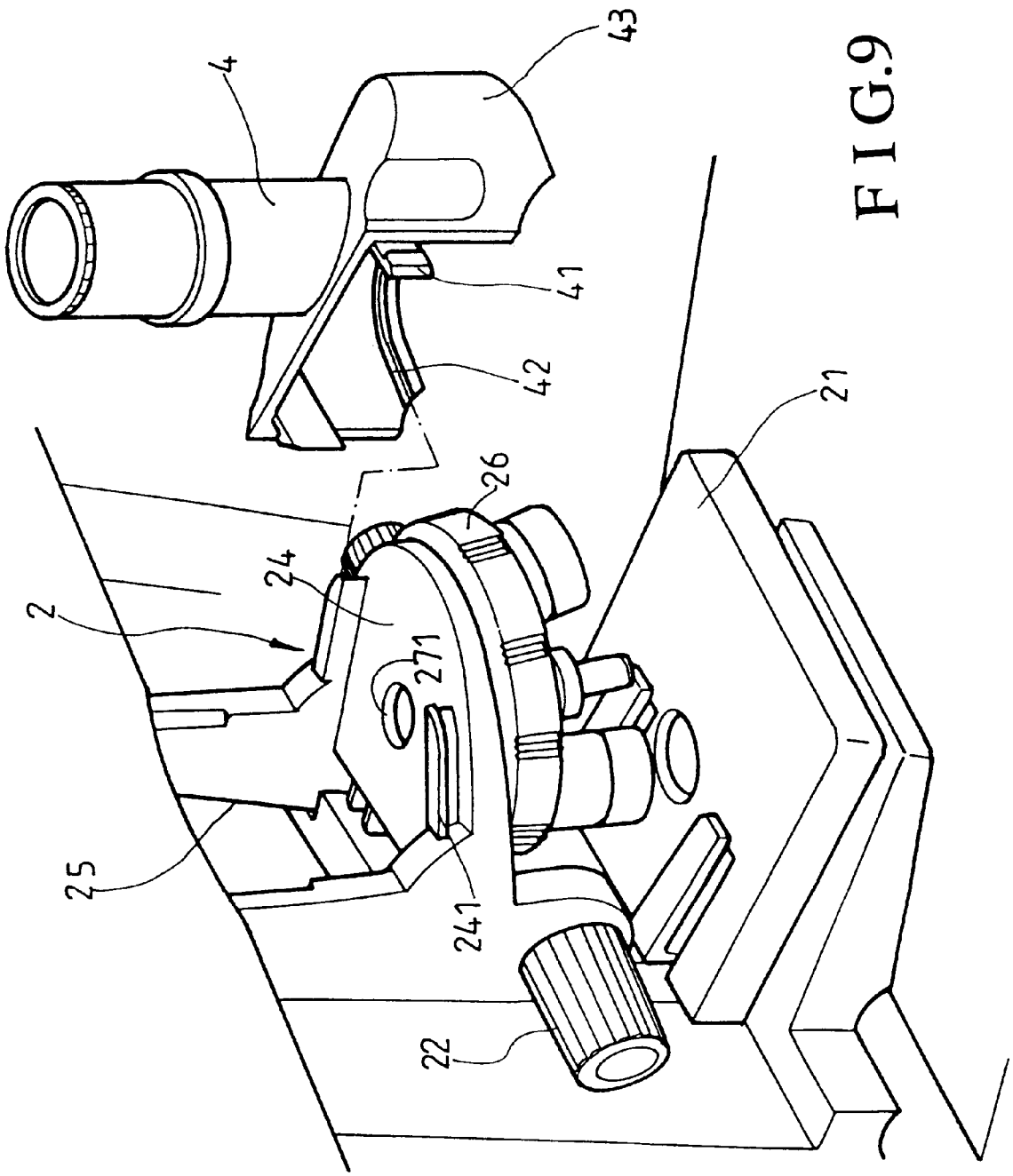
FIG. 9 is a partial perspective view of the microscopic means of the present invention in association with the eyepiece to be used as a microscope.

Two engaging pins 1411 are disposed in the base 14 at both sides of the base 14. Two pushing buttons 141 are respectively connected to the engaging pins 1411. The pushing buttons 141 extend beyond the base 14. A spring 143 is disposed between the two engaging pins 1411. Under a normal condition, the engaging pins 1411 extend out of two sides of the base 14. The base 14 is covered and fixed to the body 1 by extending the engaging pins 1411 into the engaging holes 142 at both sides of the body 1, as shown in FIG. 4. When the two pushing buttons 141 are pushed by the fingers of the user, the two engaging pins 1411 move toward each other and the ends of the pins 1411 move out of the engaging holes 142. Thus, the base 14 is opened and the microscopic means 2 appears. After the base 14 is opened and extends in a horizontal direction, the pushing buttons 141 can touch the ground and support the base 14 as legs. A cell chamber 19 which is accessible by opening a cell cover 17 can be formed in the base 14. Several electrical cells may be inserted in the cell chamber 19 to provide electrical power to the light source 27. At the upper and lower parts of the circumference of the cell chamber 19 are an upper securing hole 192 and two lower securing holes 191. The cell cover 17 is used to cover the cell chamber 19. Two engaging protrudents 172 which can be received by the lower securing holes 191 are formed at the lower side of the cell cover 17. At the upper side of the cell cover 17 is an engaging sheet 171 which is formed to match the location of the upper securing hole 192. The cell cover 17 is fixed to the base 14 by inserting the engaging protrudents 172 into the lower securing holes 192, and pushing the engaging sheet 171 into the upper securing hole 192. The cell cover 17 can be removed by pressing the engaging sheet 171 in order to replace the cells. With reference to FIGS. 5 and 8, the microscopic means 2 which is disposed in the inner side of the base 14 is a conventional microscopic means. The microscopic means 2 comprises a stage 21 for holding a sample to be seen, a floor 24 for holding and fixing the optical means, a revolving nosepiece 26 which is disposed below the floor 24, an arm 23 which extends from the base 14 to the stage 21 for supporting the stage 21 and the floor 24, a focus adjustment 22 which regulates the height of the floor 24, one or more objectives 261 of different magnification attached to the revolving nosepiece 26 and a light source 27 which is disposed below the stage 21. Most of the structure of the microscopic means 2 is well known and is not the feature of the present invention. The microscopic means 2 is characterized in that two sliding rails 241 which are disposed at both sides of the floor 24 are used to fix to the sliding slot 33 of the mirror seat 3 or the sliding groove 42 of the eyepiece 4 as shown in FIGS. 8 and 9.

In the present invention, the mirror seat 3 comprises a frame 34 having a U-shaped cross-section, two first engaging hooks 32 at both sides of the frame 34, and a sliding slot 33 at each side of the frame 34. A second reflecting mirror 31 is placed in the frame 34. The mirror seat 3 is secured to the floor 24 by engaging the sliding slot 33 of the mirror seat 3 to the sliding rail 241, and latching the first engaging hook 32 to the edge 25 of the arm 23 so that the aperture 271 on the floor 24 is at a corresponding location to the second reflecting mirror 31 as shown in FIG. 8.

In the present invention, the eyepiece 4 comprises an eyepiece housing 43 having a U-shaped cross-section, two second engaging hooks 41 at both sides of the eyepiece housing 43, and a sliding groove 42 at each side of the housing. The eyepiece 4 is secured to the floor 24 by engaging the sliding groove 42 of the eyepiece 4 to the sliding rail 241 and latching the second engaging hook 41 to the edge 25 of the arm 23 as shown in FIG. 9.

Figure 2:
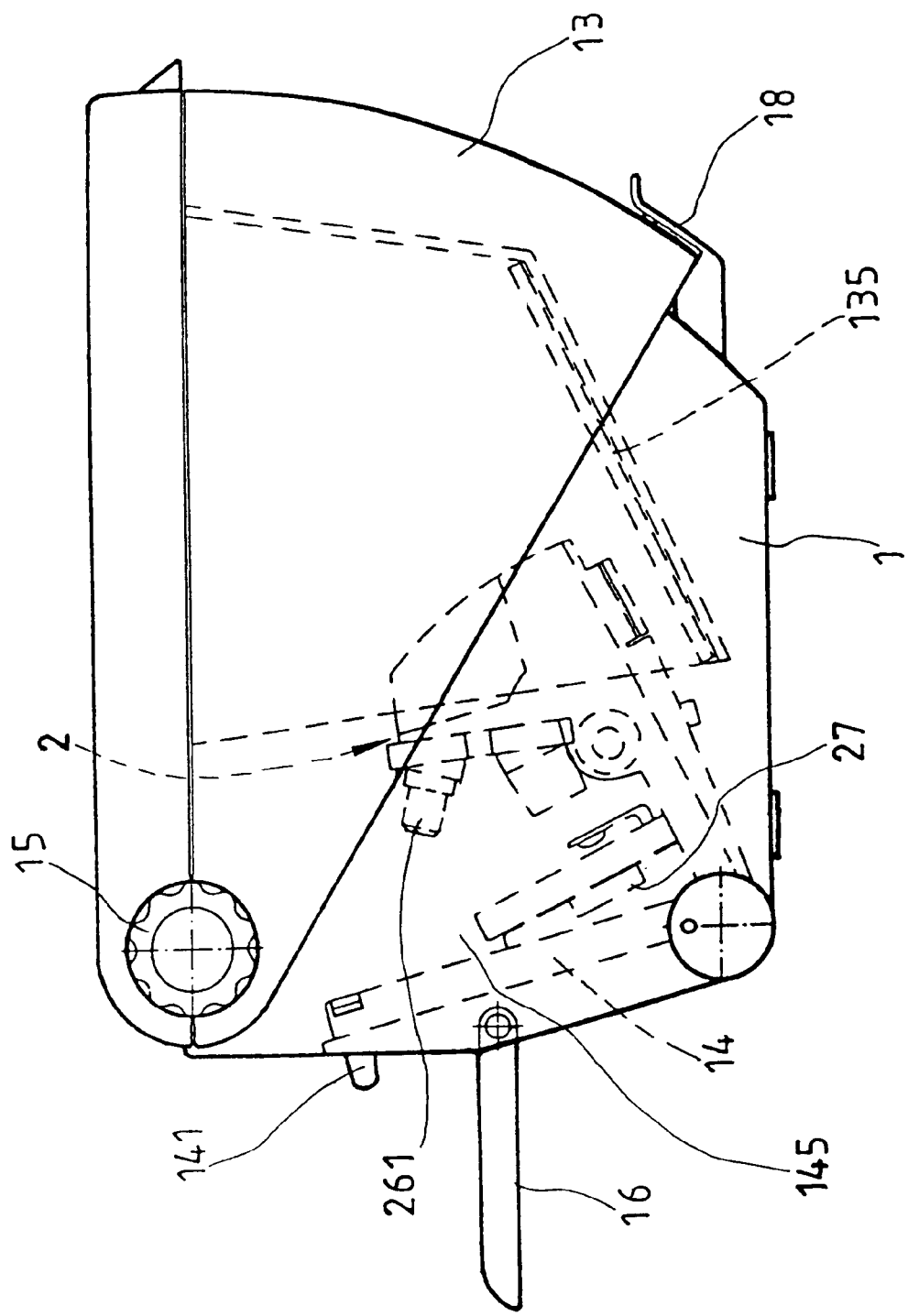
FIG. 2 is a side schematic view of the portable projection microscope of the present invention showing that the microscopic means is contained in the body.
Figure 3:
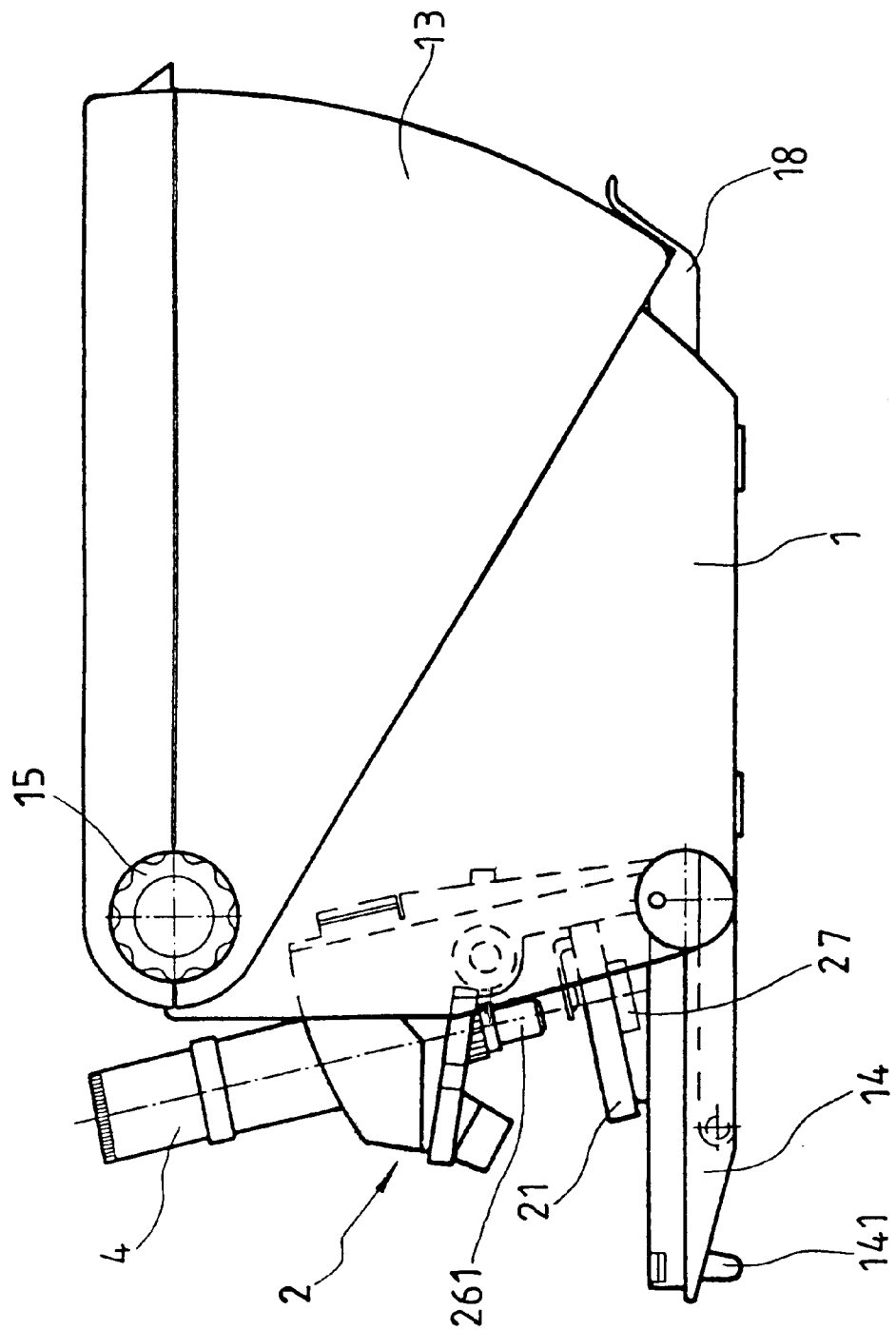
FIG. 3 is a side schematic view of the portable projection microscope of the present invention showing that the microscopic means is out of the body.
Figure 6:
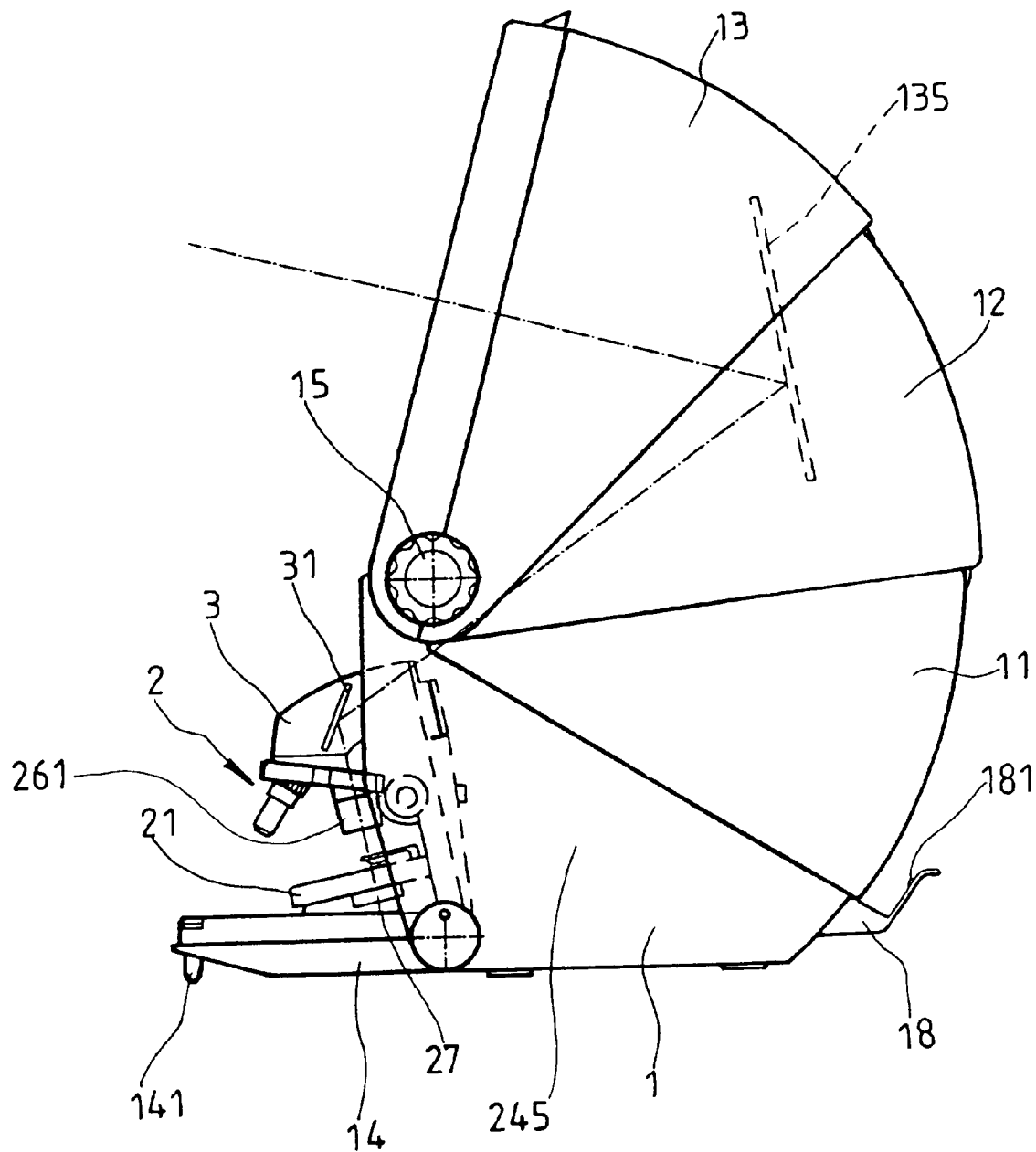
FIG. 6 is a side schematic view of the portable projection microscope of the present invention showing that the second reflecting mirror in the mirror seat in association with the first reflecting mirror can project the enlarged image of the sample to the screen.

As shown in FIGS. 2, 5, 6 and 7, the portable projection microscope of the present invention optionally comprises a plurality of casings. In one preferred embodiment of the present invention, the portable projection microscope comprises a first casing 11, a second casing 12, and a third casing 13. The casings of the present invention are of U-shape. One of the casings slides over the other and the casings are pivotably mounted on the body 1 to cover the microscopic means 2 when the portable projection microscope is in the portable state. The third casing 13 is fixed to the screen 131. At the upper and lower side of the screen 131 are an upper fixing hole 132 and two lower fixing holes 133. A first reflecting mirror 135 which is at an angle of 450 to the screen 131 is disposed in the third casing 13 as shown in FIGS. 2 and 6. The casings can rotate about the axis of an adjustment knob 15 so that the third casing 13 is approximately vertical to the ground. The casings 11, 12, 13 can overlap others one by one to be collected at the back of the body 1. At both sides of the casings 11, 12, 13 are two adjustment knobs 15 for positioning and fixing the casings 11, 12, 13 for regulating the positioning angle of the casings 11, 12, 13.

Figure 7:
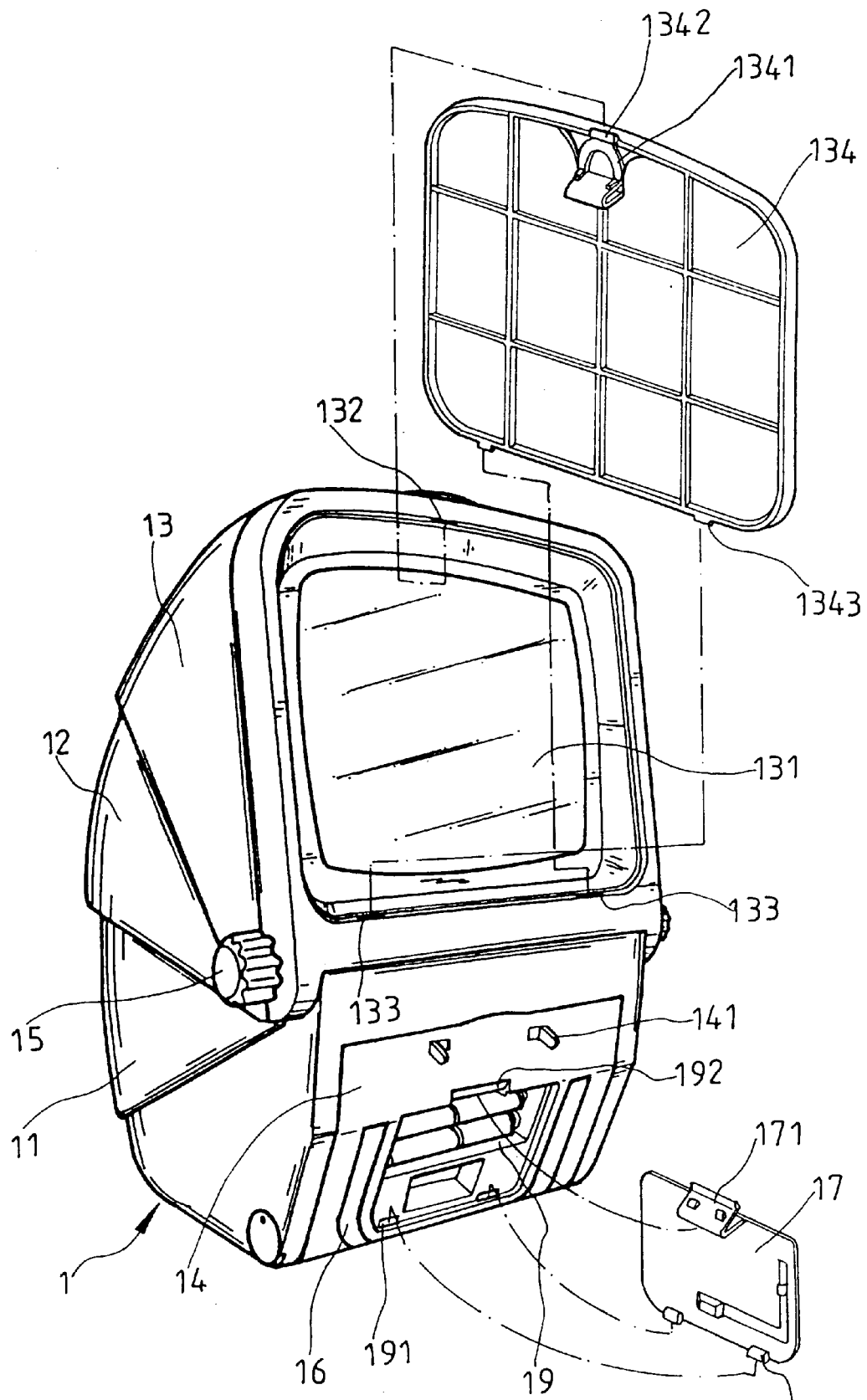
FIG. 7 is a perspective view of the portable projection microscope of the present invention showing the structure of a cell cover and a cover panel.

The portable projection microscope of the present invention optionally comprises a cover panel 134. An elastic pressing sheet 1341 is disposed at the upper side of the cover panel 134. An upper fixing hook 1342 is formed on the elastic pressing sheet 1341. At the lower side of the cover panel 134 are two lower fixing protrudents 1343 corresponding to the lower fixing holes 133. The screen 131 is protected by the cover panel 134 which is fixed to the screen 131 by inserting the lower fixing protrudents 1343 into the lower fixing holes 133 and by elastically inserting the upper fixing hook 1342 into the upper fixing hole 132. The cover panel 134 can be removed from the screen 131 by reversing the above procedures as can be seen in FIG. 7.

An engaging portion 18 having a slot is disposed at the back side of the body 1 of the present invention as shown in FIGS. 2 and 6. A protrudent portion 181 is connected to the engaging portion 18. When the casings 11, 12, 13 are received in the engaging portion 18 to be in the portable state, the protrudent portion 181 can be inserted into the casing 13 in order to fix the casings 11, 12, 13.

When the portable projection microscope of the present invention is used as a projector, the mirror seat 3 is mounted on the floor 24 of the microscopic means 2 and the power switch 144 is turned on. The light from the light source 27 radiates upwardly, passes through objective 261, the second reflecting mirror 31, and the first reflecting mirror 135, and is projected on the screen 131. The users can see the enlarged image of the sample on the stage 21 by looking at the screen 131. When the portable projection microscope of the present invention is used as a microscope, the mirror seat 3 is dismantled from the floor 24, and the eyepiece 4. The light from the light source 27 radiates upwardly, passes through the objective 261 and eyepiece 4, and is seen by the user. Because the volume of the portable projection microscope of the present invention is reduced after it is in the portable state, the portable microscope is very convenient to carry by holding the handle 16.

While the invention has been particularly shown and described with reference to these preferred embodiment, it will be understood by those skilled in the art that various changes in form and details may be made without departing from the spirit and scope of the invention. Although only the preferred embodiments of this invention were shown and described in the above description, it is requested that any modification or combination that comes within the spirit of this invention be protected.

We claim:

1. A portable projection microscope comprising:
   a body comprising a housing, and a base pivotably mounted on said housing, said housing having two engaging holes, and said base having two engaging pins, two buttons secured to said two engaging pins and extended out of said base and a spring disposed between said engaging pins, wherein said engaging pins are inserted into said engaging holes when the microscope is in a portable state; and said engaging pins are moved out of said engaging holes for opening said base when said buttons are pushed towards each other simultaneously;
   a microscopic means being secured to said base and having at least one objective;

a screen having one side pivotably mounted on said housing for exhibiting an enlarged image from said microscopic means;

an optical means for directing said enlarged image to be displayed before a user from an objective of said microscope means, said optical means being mounted on said microscopic means; and a plurality of angle regulating components mounted on said housing for regulating an angle between said screen and said body.

2. A portable projection microscope comprising:

a body having a housing, and a base pivotably mounted on said housing, said housing having an engaging device comprising a slot and a protrudent part;

a microscopic means being secured to said base and having at least one objective;

a screen having one side pivotably mounted on said housing for exhibiting an enlarged image from said microscopic means;

an optical means for directing said enlarged image to be displayed before a user from an objective of said microscopic means, said optical means being mounted on said microscopic means; and a plurality of angle regulating components mounted on said housing for regulating an angle between said screen and said body; and a first casing being fixed to said screen, said first casing being pivotably slid over said housing and received in said slot of said engaging device, and said protudent part of said engaging device being inserted in said first casing in order to latch and fix said first casing to said housing when said portable projection microscope is in a portable state.

3. The portable projection microscope according to claim 2, further comprising at least a second casing pivotably mounted on said housing, wherein said second casing is pivotably slid over said housing and said first casing is pivotably slid over said second casing for being received in said slot of said engaging device when said portable projection microscope is in a portable state.

4. A portable projection microscope comprising:

a body having a housing, and a base pivotably mounted on said housing;

a microscopic means being secured to said base, said microscopic means having at least one sliding rail, at least one objective, and an arm with two edges,;

a screen having one side pivotably mounted on said housing for exhibiting an enlarged image from said microscopic means;

an optical means for directing said enlarged image to be displayed before a user from an objective of said microscope means, said optical means having a housing frame with two engaging hooks to be latched to said two edges of said arm and at least one sliding groove to be engaged with a sliding rail on said microscopic means, and said optical means being mounted on said microscopic means by said engaging hooks and said sliding groove; and a plurality of angle regulating components mounted on said housing for regulating an angle between said screen and said body.

5. The portable projection microscope according to claim 4, wherein said angle regulating components are adjustment knobs.

6. The portable projection microscope according to claim 4, said housing further having two engaging holes and said base further having two engaging pins, two buttons being secured to said two engaging pins and extended out of said base and a spring disposed between said engaging pins, wherein said engaging pins are inserted into said engaging holes when the microscope is in a portable state, said engaging pins are moved out of said engaging holes for opening said base from said body when said buttons are pushed toward each other simultaneously.

7. The portable projection microscope according to claim 4, said base further comprising a battery cell chamber for receiving battery cells that power said projection microscope.

8. The portable projection microscope according to claim 4, wherein said optical means comprises an eyepiece.

9. The portable projection microscope according to claim 4, wherein said optical means comprises a mirror seat for housing a reflecting mirror.

10. The portable projection microscope according to claim 9, wherein said reflecting mirror is at an acute angle to said screen.

11. The portable projection microscope according to claim 4 comprising a first casing being fixed to said screen, and said housing further having an engaging device comprising a slot and a protrudent part, said first casing being pivotably slid over said housing and received in said slot of said engaging device, and said protudent part of said engaging device being inserted in said first casing in order to latch and fix said first casing to said housing when said portable projection microscope is in a portable state.

12. The portable projection microscope according to claim 11, further comprising at least a second casing pivotably mounted on said housing, wherein said second casing is pivotably slid over said housing and said first casing is pivotably slid over said second casing for being received in said slot of said engaging device when said portable projection microscope is in a portable state.

13. The portable projection microscope according to claim 4, further comprising a cover panel for covering said screen.

14. The portable projection microscope according to claim 13, wherein a plurality of lower and upper engaging holes are formed on the circumference of said screen, at least a lower protrudent is formed near a lower edge of said cover panel and an upper engaging hook formed on an elastic pressing sheet is affixed near an upper edge of said cover panel, said lower protrudent being inserted into a lower engaging hole and said upper engaging hook being engaged in an upper engaging hole when said cover panel covers said screen, and said cover panel being removed from said screen when said elastic pressing sheet is pressed to disengage said upper engaging hook.

15. The portable projection microscope according to claim 4, said microscopic means comprising a floor whereon said sliding rail is formed.

16. The portable projection microscope according to claim 4, further comprising a handle pivotably mounted on said base.

* * * * *